(12) United States Patent
Omura et al.

(10) Patent No.: US 9,718,361 B2
(45) Date of Patent: Aug. 1, 2017

(54) POWER SUPPLY SYSTEM

(75) Inventors: Gentaro Omura, Tokai (JP); Takahiro Chuman, Nagoya (JP); Kenji Nakajima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 561 days.

(21) Appl. No.: 14/001,099

(22) PCT Filed: Apr. 5, 2012

(86) PCT No.: PCT/JP2012/002388
§ 371 (c)(1),
(2), (4) Date: Aug. 22, 2013

(87) PCT Pub. No.: WO2012/140855
PCT Pub. Date: Oct. 18, 2012

(65) Prior Publication Data
US 2014/0021782 A1 Jan. 23, 2014

(30) Foreign Application Priority Data
Apr. 14, 2011 (JP) .................. 2011-090312

(51) Int. Cl.
*B60L 1/00* (2006.01)
*B60L 3/00* (2006.01)
(Continued)

(52) U.S. Cl.
CPC *B60L 1/00* (2013.01); *H02J 1/14* (2013.01); *H02J 9/00* (2013.01); *H02J 9/06* (2013.01);
(Continued)

(58) Field of Classification Search
CPC H02J 9/00; H02J 7/00; Y10T 307/625; F02N 11/0866; B60R 16/03; G06F 7/00
(Continued)

(56) References Cited

U.S. PATENT DOCUMENTS 6,452,364 B1 * 9/2002 Saeki ............... H02J 7/022
320/137
2009/0115252 A1 * 5/2009 Caraghiorghiopol ..... H02J 1/10
307/48
(Continued)

FOREIGN PATENT DOCUMENTS

JP H11-224132 A 8/1999
JP 2010-148213 A 7/2010
(Continued)

OTHER PUBLICATIONS

Office action dated Mar. 4, 2014 in corresponding Japanese Application No. 2011-090312.
(Continued)

*Primary Examiner* — Rexford Barnie
*Assistant Examiner* — Jagdeep Dhillon
(74) *Attorney, Agent, or Firm* — Harness, Dickey & Pierce, P.L.C.

(57) ABSTRACT

A power supply system includes an electric storage device, a connecting terminal area, a main energization line, a sub-energization line, a first energization switching unit for switching between an energized state and a non-energized state of an energization line of the main energization line connecting the electric storage device and a loading apparatus, a second energization switching unit for switching between an energized state and a non-energized state of an energization line of the main energization line connecting a branched part and the connecting terminal area, a third energization switching unit for switching between an energized state and a non-energized state of an energization line of the main energization line connecting the second energization switching unit and the connecting terminal area, and a control device that detects switching states of the first,
(Continued)

second and third energization switching units and that controls their switching operations.

19 Claims, 5 Drawing Sheets

(51) Int. Cl.
  *H02G 3/00* (2006.01)
  *H02J 9/00* (2006.01)
  *H02J 1/14* (2006.01)
  *H02J 9/06* (2006.01)
(52) U.S. Cl.
  CPC ...... *H01M 2220/20* (2013.01); *Y10T 307/625* (2015.04)
(58) Field of Classification Search
  USPC ............ 307/10.1, 10.2, 10.6, 66, 72, 80, 48; 320/137, 135, 138; 323/371, 220; 180/65.31, 65.51
  See application file for complete search history.

(56) References Cited

U.S. PATENT DOCUMENTS

| 2010/0045107 A1* | 2/2010 | Cohen ................... H02J 9/062 307/23 |
| 2011/0018349 A1* | 1/2011 | Rockenfeller ........ F25B 49/022 307/66 |
| 2011/0156483 A1* | 6/2011 | Caraghiorghiopol ... G06F 1/263 307/66 |
| 2012/0185708 A1* | 7/2012 | Rekimoto ............... G06F 1/266 713/310 |

FOREIGN PATENT DOCUMENTS

| JP | 2011-109794 A | 6/2011 |
| JP | 2012182879 A * | 9/2012 |

OTHER PUBLICATIONS

International Search Report and Written Opinion of the ISA for PCT/JP2012/002388, ISA/JP, mailed Jun. 12, 2012.

* cited by examiner

POWER SUPPLY SYSTEM

CROSS-REFERENCE TO RELATED APPLICATION

This application is a 371 U.S. National Stage of International Application No. PCT/JP2012/002388, filed Apr. 5, 2012, which is based on Japanese Patent Application No. 2011-90312 filed on Apr. 14, 2011, the disclosure of which is incorporated herein by reference.

TECHNICAL FIELD

The present disclosure relates to a power supply system that can operate a loading apparatus by electric power supplied from a secondary battery and electric power supplied from an external power source.

BACKGROUND ART

A power supply system disclosed in a patent document 1 is known for a conventional technology. This power supply system includes a power supply part attached to an electric device to supply electric power, and a power source circuit disposed in the electric device. When an AC adaptor is removed from a main body of the electric device, and the electric device is operated by a secondary battery in the electric device, the power supply system prevents generation of a short-circuit current from the secondary battery to the outside by short-circuiting of a power receiving terminal of the electric device.

The electric device main body constitutes a circuit that cuts off the secondary battery from the power receiving terminal based on a control signal inputted from the power supply part. When the control signal is zero, the secondary battery and the power receiving terminal are cut off so that the short-circuit current is not generated.

PRIOR ART DOCUMENT

Patent Document

Patent document 1: JP-A-H11-224132

The above power supply system described in the patent document 1 is structured to include an isolation transformer on the power supply part-side. Accordingly, although an effective short circuit prevention mechanism can be developed, the system becomes large-sized and heavy if the isolation transformer is specified to deal with a high electric current. Thus, there is an issue that the entire system grows in size and becomes heavy in weight.

SUMMARY

It is an object of the present disclosure to provide a power supply system that can prevent a short-circuit current from an electric storage device to outside without a transformer.

To achieve the above-described object, in a mode of the present disclosure, a power supply system is electrically-connected to a system power source. The power supply system includes an electric storage device, a connecting terminal area, a main energization line, a sub-energization line, a first energization switching unit, a second energization switching unit, a third energization switching unit, and a control device. The electric storage device is configured to be capable of being charged with electric power supplied by the system power source and to be capable of discharging electric power into a loading apparatus, which is capable of operating through use of the electric power supplied by the system power source. The connecting terminal area is provided to be connected to the system power source at time of the electric connection of the power supply system to the system power source. The main energization line connects together the connecting terminal area and the electric storage device. The sub-energization line branches from a branched part, which is provided on the main energization line, to connect together the loading apparatus and the main energization line. The first energization switching unit switches an energization line of the main energization line, which connects the electric storage device and the loading apparatus, between an energized state and a non-energized state. The second energization switching unit switches an energization line of the main energization line, which connects together the branched part and the connecting terminal area, between an energized state and a non-energized state. The third energization switching unit switches an energization line of the main energization line, which connects together the second energization switching unit and the connecting terminal area, between an energized state and a non-energized state. The control device detects switching states of the first energization switching unit, the second energization switching unit and the third energization switching unit and controls their switching operations.

Accordingly, through the detection of the switching states of the first energization switching unit, the second energization switching unit, and the third energization switching unit by the control device, it can be determined whether the electric storage device and the connecting terminal area are conducted to each other. Moreover, if there is a possibility of conduction between the electric storage device and the connecting terminal area, the switching operation of the energization switching unit(s) needed for putting them into a non-conduction state can be controlled. Accordingly, a state in which an electric current from the electric storage device leaks into the connecting terminal area can be prevented. Thus, there can be provided the power supply system that can prevent a short-circuit current from the electric storage device to the outside by a configuration that does not need a transformer.

The control device controls the third energization switching unit to be switched into a non-energized state, when the control device detects the switching state of the second energization switching unit to be an energized state; or when the control device detects that: the switching state of the second energization switching unit is a non-energized state; and the switching state of the first energization switching unit is an energized state after the first energization switching unit is controlled to be switched into a non-energized state.

Accordingly, if it is detected that the second energization switching unit is in an energized state, the third energization switching unit is controlled to be switched into a non-energized state. As a result, the electric discharge from the electric storage device is prevented from flowing into the connecting terminal area as a short-circuit current. Alternatively, if it is detected that the second energization switching unit is in a non-energized state; and that the first energization switching unit is in an energized state after the first energization switching unit is controlled to be switched into a non-energized state, the third energization switching unit is controlled to be switched into a non-energized state. Accordingly, it is detected that there is a possibility of a conducted state between the second energization switching unit and the first energization switching unit such that they are uncontrollable to be operated for some reason. Similar to the above, the electric discharge from the electric storage device is prevented from flowing into the connecting terminal area as a short-circuit current. Through the detection of an energized state of each energization switching unit and its operation control, there can be detected such a conducted state that the switching units are uncontrollable to be operated; and a short-circuit current can be reliably prevented.

The power supply system further includes a notifying means for notifying outside about a conducted state between the electric storage device and the connecting terminal area. The control device controls the notifying means to notify the outside before or after the control device controls the third energization switching unit to be switched into a non-energized state.

As a result, if there is a possibility that the electric discharge from the electric storage device is flowing through the connecting terminal area as a short-circuit current, the outside is notified about this state through the notifying means. Accordingly, there can be reliably and promptly taken required measures such as cancellation of the operation of connection between the connecting terminal area and the system power source, and implementation of the maintenance.

The control device is capable of detecting whether the connecting terminal area is electrically-connected to the system power source. The control device controls the third energization switching unit, the second energization switching unit, and the first energization switching unit to be switched into an energized state in this order when: the control device detects that the switching state of the second energization switching unit is a non-energized state; the control device detects that the switching state of the first energization switching unit is a non-energized state after the first energization switching unit is controlled to be switched into a non-energized state; and the control device detects that the connecting terminal area is electrically-connected to the system power source.

Accordingly, through the above-described sequence of processings by the control device before the detection of electric connection of the connecting terminal area to the system power source, a non-conducted state between the electric storage device and the connecting terminal area can be determined. In this case, the third energization switching unit, the second energization switching unit, and the first energization switching unit in this order from the side closer to the system power source are controlled to be switched into an energized state. As a result, the charging of the electric storage device by the system power source can be carried out safely, and the electric power of the system power source can be supplied to the loading apparatus.

The loading apparatus is an air-conditioning system that controls air-conditioning of a vehicle interior. If the loading apparatus is an air-conditioning system, it is necessary to always maintain the devices associated with the air-conditioning system in an operable state to secure comfortableness in the vehicle interior. Accordingly, the devices associated with the air-conditioning system can be maintained in its operable state by the electric discharge from the electric storage device, and the electric power supply from the system power source. The operation of connection between the connecting terminal area and the system power source, which is carried out relatively frequently for this purpose, can be safely performed.

The loading apparatus is a refrigeration cycle system that regulates temperature of a freezing chamber provided in a refrigerator car. In order to maintain freshness of perishable food and so forth in a refrigerator car, it is necessary to always maintain the refrigeration cycle system in an operable state. Accordingly, the refrigeration cycle system can be maintained in its operable state by the electric discharge from the electric storage device, and the electric power supply from the system power source. The operation of connection between the connecting terminal area and the system power source, which is carried out relatively frequently for this purpose, can be safely performed.

The power supply system further includes a vehicle and a charging stand. The main energization line is formed by an electric connection of the vehicle and the charging stand. The control device includes: a vehicle control device that is disposed in the vehicle; and a stand control device that controls the charging stand.

Accordingly, the main energization line is configured by electrical components disposed in the vehicle and electrical components disposed in the charging stand. The respectively existing control devices can be assigned the necessary detection of switching states of the above-described energization switching units and their switching control. As a result, the power supply system, in which the configuration relating to the detection and control is simplified, can be provided.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
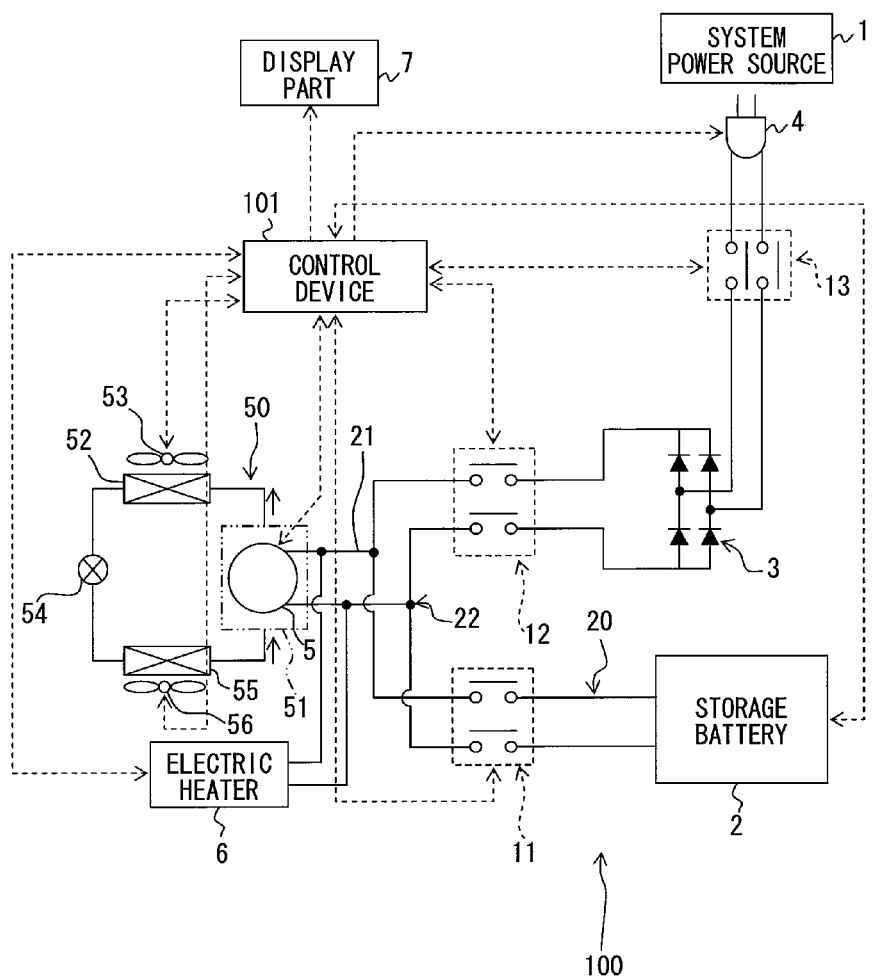
FIG. 1 is a diagram illustrating general configuration of a power supply system in accordance with a first embodiment.

Embodiments will be described below in reference to the drawings. In the embodiments, the same corresponding reference numeral may be used for a part corresponding to a matter described in a preceding embodiment, to omit the repeated description. In the embodiments, when only a part of configuration is described, earlier-described another embodiment can be applied to the other part of configuration. In the embodiments, in addition to combination between parts which are specifically shown to be combinable, embodiments can be combined partially with each other even if not expressly shown as long as the combination does not particularly create problems.

First Embodiment

A first embodiment will be described with reference to FIGS. 1 and 2.

In a power supply system 100, which is illustrated, a storage battery 2, which is an example of an electric storage device, can be charged with electric power of a system power source 1 supplied from an electric power supply source (electric power company) based on an electric power supply contract. Also, the electric power of the source 1 can be used for operation of a loading apparatus. Furthermore, the system 100 is a system configured such that the electric power stored in the storage battery 2 is discharged to be used for the operation of the loading apparatus.

The power supply system 100 is, for example, a system disposed in a vehicle. The vehicle is, for example, an electric vehicle (EV), or a plug-in hybrid vehicle (PHV). The electric storage device is a secondary battery as a in-vehicle battery. The loading apparatus is an electric apparatus that is operated by the electric power discharged from the storage battery 2 and the electric power supplied by the system power source. The loading apparatus is, for example, an electric component in an air-conditioning system disposed in the vehicle, or a refrigeration cycle system 50 for regulating temperature of a freezer compartment in a refrigerator car. The example of the loading apparatus described in the present embodiment includes a compressor motor 5, an electric heater 6, an outdoor blower 53, and an indoor blower 56.

As described in FIG. 1, the power supply system 100 includes, for example, the storage battery 2 including more than one lithium-ion secondary battery; an outlet 4 provided to connect to the system power source 1 when the system 100 is electrically-connected to the system power source 1; a main energization line 20 connecting the outlet 4 and the storage battery 2; and a sub-energization line 21 branching from a branched part 22, which is provided in the main energization line 20, to connect the loading apparatus and the main energization line 20. Furthermore, the power supply system 100 includes a first switch 11, a second switch 12, a third switch 13, an electric power converter 3, and a control device 101.

The first switch 11 is a first energization switching unit for switching an energization line of the main energization line 20 connecting the storage battery 2 and the loading apparatus between an energized state and non-energized state. The first switch 11 is a relay contact for putting the energization between input and output ends of the storage battery 2, and an input end of the loading apparatus into an ON state or OFF state. The first switch 11 is also a relay contact for putting the energization between the input and output ends of the storage battery 2, and the second switch 12 into an ON state or OFF state.

The second switch 12 is a second energization switching unit for switching an energization line of the main energization line 20 connecting the branched part 22 and the outlet 4 between an energized state and non-energized state. The second switch 12 is a relay contact for putting the energization between the outlet 4 and the input end of the loading apparatus into an ON state or OFF state. The second switch 12 is also a relay contact for putting the energization between the input and output ends of the storage battery 2, and the third switch 13 into an ON state or OFF state.

The third switch 13 is a third energization switching unit for switching an energization line of the main energization line 20 connecting a switching part by the second switch 12 and the outlet 4 between an energized state and non-energized state. The third switch 13 is an energization switching unit disposed at a position that is closest to the system power source 1. When the switch 13 is controlled to be put into its non-energized state, the short-circuit current from the storage battery 2 does not reach a terminal area of the outlet 4, and the electric power of the system power source 1 does not pass through the loading apparatus or the storage battery 2.

The electric power converter 3 is a rectifier diode. The converter 3 is configured to convert direct-current voltage into alternating-current voltage to output the voltage and to convert alternating-current voltage into direct-current voltage to output the voltage. The storage battery 2, the first switch 11, the branched part 22, the second switch 12, the electric power converter 3, the third switch 13, and the outlet 4 are provided in this order along the main energization line 20. One end of the sub-energization line 21 is the branched part 22. The compressor motor 5, the electric heater 6, the outdoor blower 53, and the indoor blower 56, which are included in the loading apparatus, are connected to the other end of the line 21.

The compressor motor 5 is configured such that its rotating speed changes in accordance with an output frequency of the electric power discharged from the storage battery 2, or the electric power supplied by the system power source 1, and is accommodated in a case of a compressor 51. The compressor 51 draws in refrigerant and compresses the refrigerant to discharge the refrigerant. A condenser 52 is connected to an outlet of the compressor 51 through a pipe. A piping connection of an evaporator 55 to the condenser 52 is made through a decompressor 54. An outlet of the evaporator 55 is piping-connected to a suction port of the compressor 51. As described above, there is configured the refrigeration cycle system 50 obtained as a result of the piping connection of the compressor 51, the condenser 52, the decompressor 54, and the evaporator 55. The condenser 52 is disposed outside the freezer compartment. The outdoor blower 53 blows air outside the vehicle, which exchanges heat with the refrigerant. The evaporator 55 is disposed inside the freezer compartment. The indoor blower 56 blows indoor air which exchanges heat with the refrigerant to be cooled into the freezer compartment to regulate the temperature in the freezer compartment.

The control device 101 is an electronic control unit for performing charge and discharge control of the storage battery 2, the electric power supply from the system power source, operation of the refrigeration cycle system 50, operations of the outdoor blower 53 and the indoor blower 56, operation of the electric heater 6, a display screen image of a display part 7 provided on an operation panel, and so forth in the power supply system 100. The control device 101 detects, for example, switching states (energized state and non-energized state) of the first switch 11, the second switch 12, and the third switch 13, and states of connection and disconnection of the outlet 4 to the system power source 1, and controls their switching operations. Thus, the control device 101 can detect and control ON and OFF of a contact of each switch. The control device 101 is configured to communicate with various kinds of control devices, various kinds of components and so forth relating to the power supply system 100, and can exchange variety of information with each other to control the operation of each part.

After the vehicle is stopped, with the outlet 4 connected to the system power source 1, the control device 101 normally controls the first switch 11, the second switch 12, and the third switch 13 in an energized state. Accordingly, the device 101 operates the loading apparatus such as the compressor motor 5 by the electric power supplied from the system power source 1, and charges the storage battery 2 with the remaining electric power supplied from the system power source 1. When load power needed by the loading apparatus is large, the control device 101 controls the first switch 11, the second switch 12, and the third switch 13 in an energized state to supply electric power to the loading apparatus such as the compressor motor 5 both by the electric power from the system power source 1 and by the electric power discharged from the storage battery 2.

Next, exemplary operation of the power supply system 100 will be described in reference to FIG. 2. As illustrated in FIG. 2, when the control device 101 is turned on and this flow chart is started, the control device 101 first determines at step 10 whether the second switch 12 is turned on and the energization line is in an energized state.

When it is determined at step 10 that the second switch 12 is in a connected state, control proceeds to step 32 to indicate an error display on the display part 7 which is an example of a notifying means. When a user connects the outlet 4 to the system power source 1 to use system electric power at time of a stop of the vehicle, the user's attention can be drawn by this error display. The user can recognize that the short-circuit current from the storage battery 2 may be passing through the terminal area of the outlet 4, and can cancel the connection of the outlet 4 or perform it carefully. Also, there may be a failure or the like at the switch of each part, so that maintenance such as repairing and checking can be encouraged.

After the error display processing at step 32, the third switch 13 is turned off at step 34 to perform processing for putting the energization line into a non-energized state. Through this processing, the energization line between the storage battery 2 and the outlet 4 is disconnected on the closest side to the outlet 4, and the main energization line 20 is set in a non-energized state. Accordingly, processing of a determination that the loading apparatus cannot be operated and the storage battery 2 cannot be charged by the system power source 1 is performed at step 36 to end this flow chart.

If it is determined at step 10 that the second switch 12 is in a disconnected state, the first switch 11 is turned off at step 20 to perform processing for putting the energization line into a non-energized state. This processing is carried out because the contact of the second switch 12 can be actually in a connected state for some reason such as adhesion although it is determined at step 10 that the second switch 12 is in a disconnected state. In this case, the second switch 12 is in an energized state.

It is determined at step 30 whether the first switch 11 is turned on and the energization line is in an energized state. If it is determined at step 30 that the first switch 11 is in a connected state, the contact of the first switch 11 may actually be in a connected state for some reason such as adhesion. For this reason, control proceeds to step 32 and after that, the above-described step 34 and step 36 are performed to end this flow chart.

If it is determined at step 30 that the first switch 11 is in a disconnected state, it is determined at step 40 whether the outlet 4 is in a connected state in which the outlet 4 is connected to the system power source 1. If it is determined at step 40 that the outlet 4 is in a disconnected state, the system power source 1 is not ready to supply the system electric power. Accordingly, after that, the above-described step 34 and step 36 are performed to end this flow chart.

If it is determined at step 40 that the outlet 4 is in a connected state, it can be determined that each switch is not in an abnormal state and is ready to use the system electric power. In the power supply system 100, the connected state of each switch can be detected through the processings described so far. Specifically, the detection of the connected state of each switch is carried out through the processings at step 10, step 20, step 30, step 32, and step 40.

Next, at step 50, the third switch 13 is turned on to perform processing for putting the energization line into an energized state. At step 60, the second switch 12 is turned on to perform processing for putting the energization line into an energized state. Then, it is determined at step 70 whether there is a command to charge the storage battery 2. If it is determined at step 70 that there is no command to charge, the loading apparatus is operated by the system power source 1 at step 72. In a state where this step is performed, the second switch 12 and the third switch 13 are in a connected state, and the first switch 11 is in a disconnected state. Therefore, a part of the main energization line 20 leading from the system power source 1 to the third switch 13, the electric power converter 3, the second switch 12, and the branched part 22 is energized. The system electric power is put into the loading apparatus to be used for the operation of the loading apparatus.

On the other hand, if it is determined at step 70 that there is a command to charge, the first switch 11 is turned on at step 80 to perform processing for putting the energization line into an energized state. Furthermore, at step 90, the charging of the storage battery 2 and the operation of the loading apparatus are carried out by the system power source 1 to end this flow chart. In a state where this step is performed, the first switch 11, the second switch 12, and the third switch 13 are in a connected state. Accordingly, both lines of the main energization line 20 and the sub-energization line 21 are energized. The system electric power is put into the loading apparatus to be used for the operation of the loading apparatus, and the rest of the system electric power is used for the charging of the storage battery 2. In this manner, in the power supply system 100, operation of each switch is controlled through the processings at step 36, and step 50 to step 90.

Operations and their effects produced by the power supply system 100 in the present embodiment will be described. The power supply system 100 includes the control device 101 for detecting the switching states of the first switch 11, the second switch 12, and the third switch 13 and for controlling their switching operations. If it is detected that the switching state of the second switch 12 is in an energized state; or if it is detected that the switching state of the second switch 12 is in a non-energized state and that the switching state of the first switch 11 is in an energized state after the first switch 11 is controlled to be switched into a non-energized state, the control device 101 controls the third switch 13 to be switched into a non-energized state.

As a result of this configuration, by the detection of the switching states of the first switch 11, the second switch 12, and the third switch 13, the control device 101 can make a determination of a conducted/non-conducted state between the storage battery 2 and the outlet 4. Moreover, if there is a possibility of conduction between the storage battery 2 and the outlet 4, the switching operations of the switches needed for putting them into a non-conduction state can be controlled. Accordingly, a state in which an electric current from the storage battery 2 leaks into the terminal area of the outlet 4 can be prevented. For example, when connecting the outlet 4 to the system power source, an operator can be prevented from touching the terminal area of the outlet 4 thereby being electrocuted him/herself.

In the present embodiment, there can be obtained the power supply system 100 that can prevent a short-circuit current from the secondary battery to the outside by a configuration which does not need a transformer as in the conventional technology to limit its heavy weight, growth in its size and costs of the system. Accordingly, when the power supply system 100 is applied to the vehicle, its load capacity can reduced and a very effective system can be disposed in the vehicle.

In the power supply system 100, the loading apparatus is the refrigeration cycle system 50 that regulates the temperature of the freezer compartment provided in a refrigerator car. In order to maintain freshness of perishable food and so forth in a refrigerator car, for example, it is necessary to always maintain the compressor motor 5, the indoor blower 56 and the outdoor blower 53, which are examples of the components that constitute the refrigeration cycle system 50, in an operable state. As a result of this configuration, the refrigeration cycle system 50 can be maintained in its operable state by the electric discharge from the storage battery 2, and the electric power supply from the system power source 1. The operation of connection between the outlet 4 and the system power source 1, which is carried out relatively frequently for this purpose, can be performed safely with the issues such as electric leakage solved.

In the power supply system 100, the loading apparatus is the air-conditioning system which controls the air-conditioning in the vehicle interior. The air-conditioning system can perform, for example, the air-conditioning in the vehicle interior when an occupant is waiting in the vehicle or when he/she is taking a nap with the outlet 4 connected to the system power source 1 at time of a stop of the vehicle. In this case, the above-described evaporator 55 is disposed in an air conditioning unit case which is an air passage for the air-conditioned wind blown to the vehicle interior. When the loading apparatus is an air-conditioning system, to secure comfortableness in the vehicle interior, for example, it is necessary to always maintain in an operable state the devices associated with the air-conditioning system, such as the compressor motor 5, the indoor blower 56, the outdoor blower 53, and the electric heater 6, which are examples of the components that constitute the refrigeration cycle system 50. As a result of this configuration, the devices associated with the air-conditioning system can be maintained in an operable state by the electric discharge from the storage battery 2, and the electric power supply from the system power source 1. The operation of connection between the outlet 4 and the system power source 1, which is carried out relatively frequently for this purpose, can be performed safely with the issues such as electric leakage solved.

If it is detected that the switching state of the second switch 12 is in an energized state; or if it is detected that the switching state of the second switch 12 is in a non-energized state and that the switching state of the first switch 11 is in an energized state after the first switch 11 is controlled to be switched into a non-energized state, the control device 101 controls the third switch 13 to be switched into a non-energized state.

As a result of this control, if it is detected that the second switch 12 is in an energized state, the passage of the electric discharge from the storage battery 2 through the outlet 4 as a short-circuit current is prevented by controlling the third switch 13 to be switched into a non-energized state. If it is detected that the second switch 12 is in a non-energized state and that the first switch 11 is in an energized state after the first switch 11 is controlled to be switched into a non-energized state, the third switch 13 is controlled to be switched into a non-energized state. Accordingly, it can be detected that there is a possibility of a conducted state between the second switch 12 and the first switch 11 such that they are uncontrollable to be operated for some reason. Through the detection of an energized state of each switch and its operation control, there can be obtained the power supply system 100 which can detect a conducted state such that the switches are uncontrollable to be operated to reliably prevent a short-circuit current.

The power supply system 100 includes the notifying means for notifying the outside of a conducted state between the storage battery 2 and the outlet 4, for example, the display part 7 for character display or lamp indicating light, or a speaker which performs voice reporting. The control device 101 controls this notifying means to notify the outside before or after the third switch 13 is controlled to be switched into a non-energized state.

As a result of this configuration, if there is a possibility that the electric discharge from the storage battery 2 is flowing through the outlet 4 as a short-circuit current, the outside is notified about this state through the notifying means. Accordingly, there can be reliably and promptly taken required measures such as cancellation of the operation of connection between the terminal area of the outlet 4 and the system power source 1, and implementation of the maintenance. Therefore, the even safer and more convenient power supply system 100 can be obtained.

If it is detected that the switching state of the second switch 12 is in a non-energized state; the first switch 11 is controlled to be switched into a non-energized state; after this, it is detected that the switching state of the first switch 11 is in a non-energized state; and it is detected that the outlet 4 is electrically connected to the system power source 1, the control device 101 controls the third switch 13, the second switch 12, and the first switch 11 in this order to be switched into an energized state.

As a result of this control, through the above-described sequence of processings by the control device 101 before the detection of electric connection of the outlet 4 to the system power source 1, a non-conducted state between the storage battery 2 and the outlet 4 can be determined. Furthermore, in this case, from a closer side to the system power source 1, the third switch 13, the second switch 12, and the first switch 11 in this order are controlled to be switched into an energized state. Accordingly, the charging of the electric storage device by the system power source 1 and the supply of the electric power of the system power source 1 to the loading apparatus can be carried out more safely.

Second Embodiment

Figure 3:
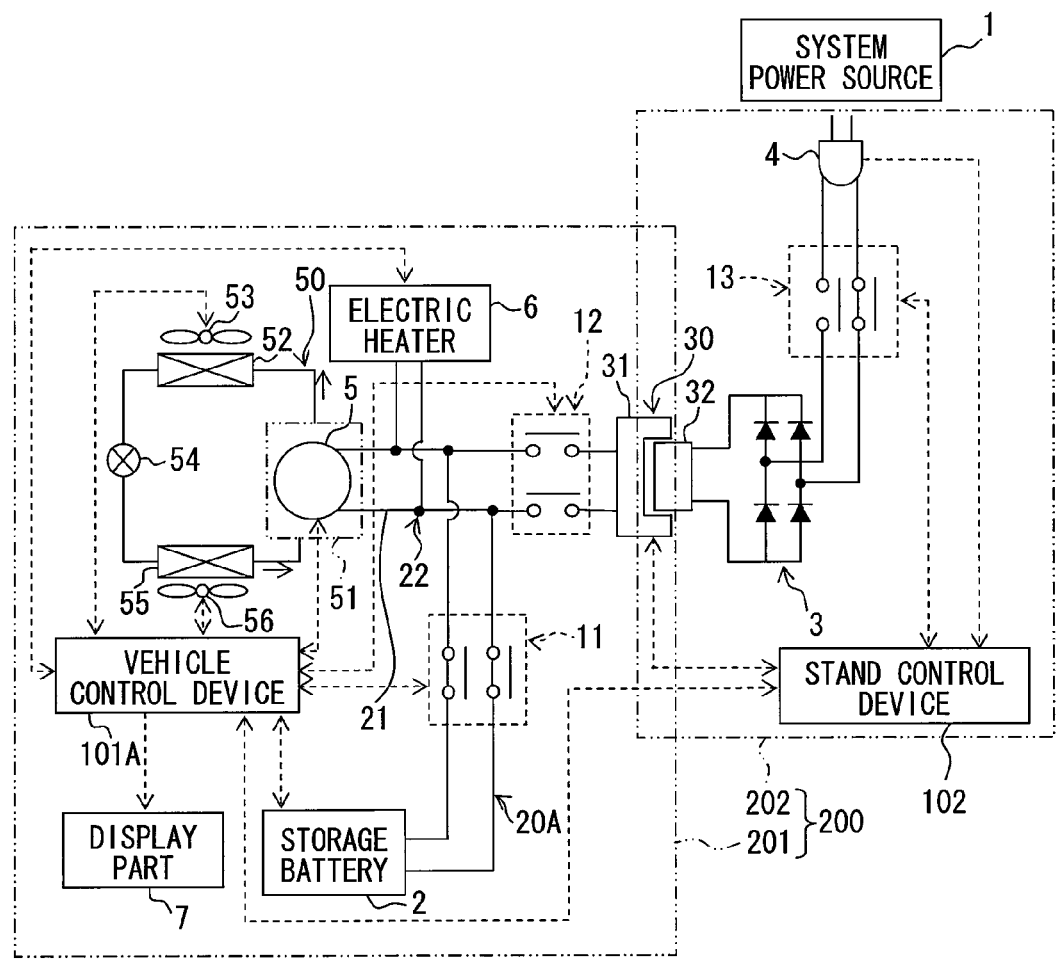
FIG. 3 is a diagram illustrating general configuration of a power supply system in accordance with a second embodiment.

A second embodiment will be described in reference to FIGS. 3 and 4. In the present embodiment, configurations, operations, and controls, which are not described in particular; and processing having the same step reference numeral as hereinbefore, are similar to the first embodiment. Also, their operations and effects are similar to the first embodiment.

A power supply system 200 is characterized in that a main energization line 20A is formed by an electric connection of a vehicle 201 and a charging stand 202, i.e., along the main energization line 20A, a storage battery 2, a first switch 11, a loading apparatus such as the compressor motor 5, and a second switch 12 are disposed in the vehicle 201. Along the main energization line 20A, an outlet 4, a third switch 13, and an electric power converter 3 are disposed in the charging stand 202, which is connected to a system power source 1 for using system electric power as its charging power.

At the energization line disposed in the vehicle 201, a vehicle-side connecting part 31 is connected to the second switch 12. At the energization line disposed in the charging stand 202, a stand-side connecting part 32 is connected to the electric power converter 3. A connector 30 is configured through a connection between the vehicle-side connecting part 31 and the stand-side connecting part 32. A string of the main energization line 20A can be provided as a result of this connection. A combination of a vehicle control device 101A disposed in the vehicle 201, and a stand control device 102 for controlling the charging stand 202 has a function corresponding to the control device 101 of the first embodiment.

Figure 2:
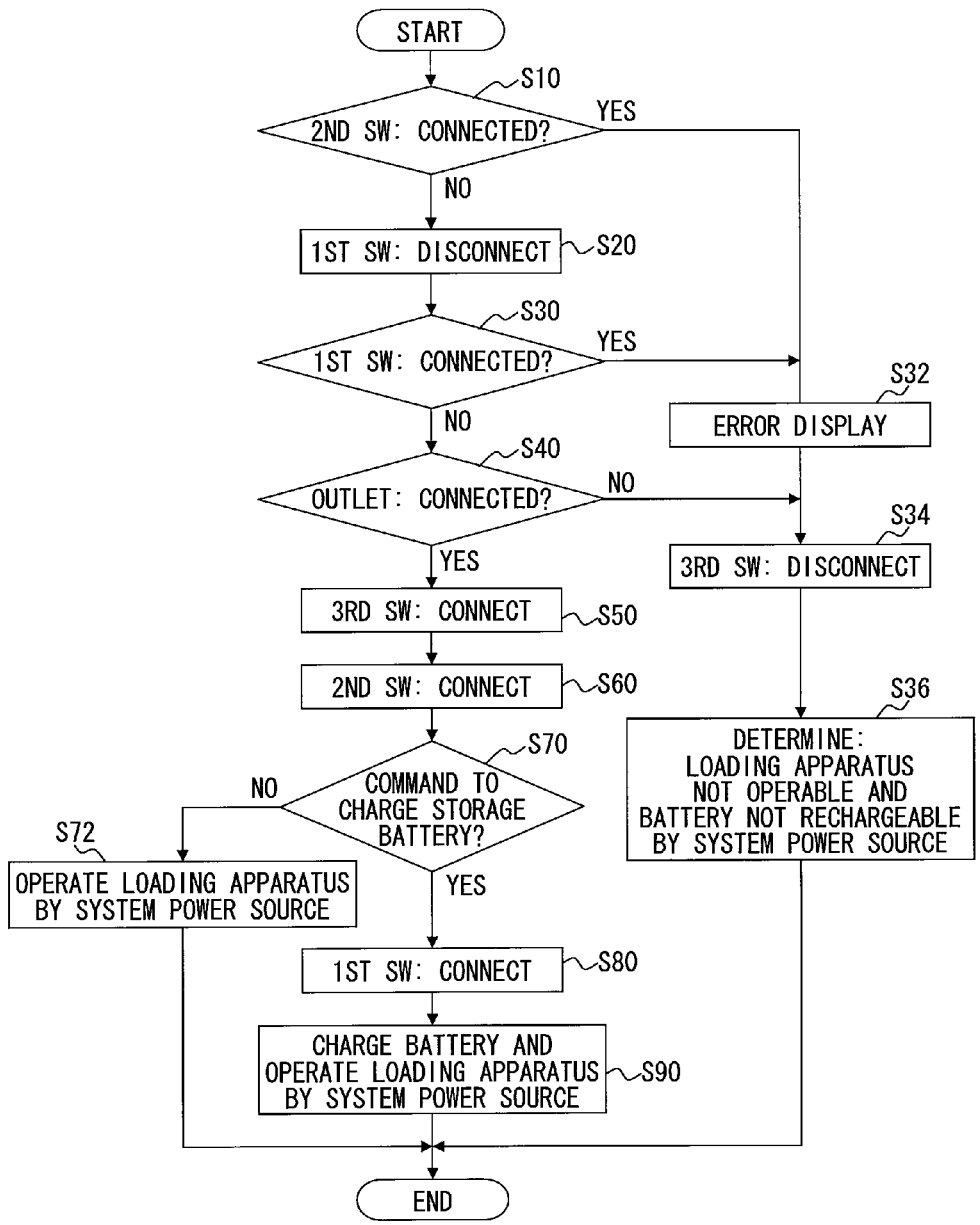
FIG. 2 is a flow chart relating to control for preventing a short-circuit current by the power supply system of the first embodiment.
Figure 4:
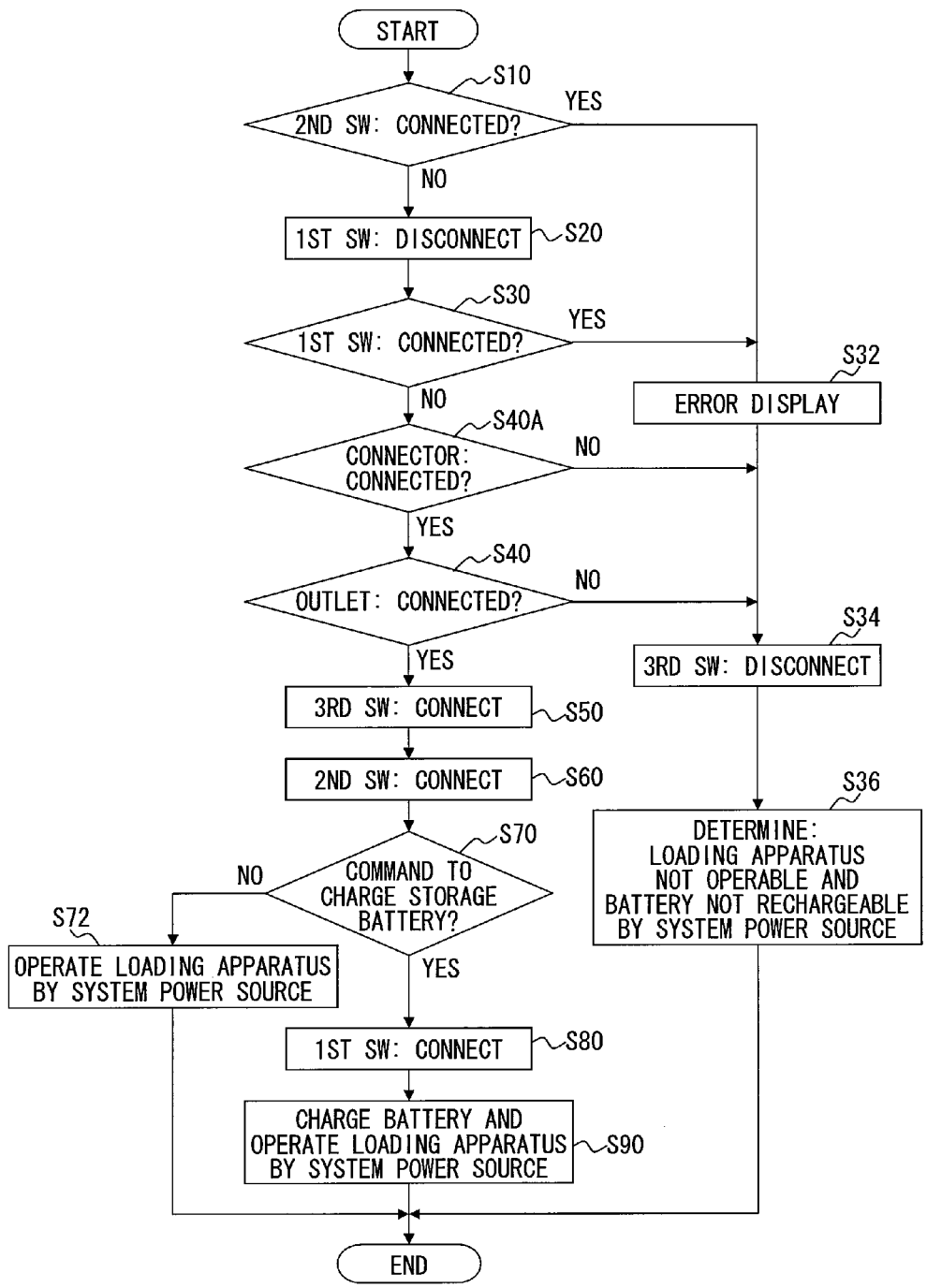
FIG. 4 is a flow chart relating to control for preventing a short-circuit current by the power supply system of the second embodiment.

A "flow chart relating to control for preventing a short-circuit current" described in the present embodiment is, as illustrated in FIG. 4, different from the flow illustrated in FIG. 2 of the first embodiment only in that step 40A is performed between NO determination at step 30 and step 40.

Respects different from the control of the first embodiment will be described below. As illustrated in FIG. 4, if it is determined at step 30 that the first switch 11 is in a disconnected state, it is determined at step 40A whether the connector 30 is in a connected state. If it is determined at step 40A that the connector 30 is in a disconnected state, the vehicle 201 and the charging stand 202 are not connected together. Accordingly, the main energization line 20A is not formed, so that system electric power is not ready to be supplied to the system 200. For this reason, after that, step 34 and step 36 are performed to end this flow chart.

If it is determined at step 40A that the connector 30 is in a connected state, the main energization line 20A is formed. Next at step 40, it is determined whether the outlet 4 is in a connected state. If it is determined at step 40A that the connector 30 is in a connected state, it can be determined that each switch is not in an abnormal state and is ready to use the system electric power. In the power supply system 200, a connected state of each switch can be detected through the processings described so far. Specifically, the detection of the connected state of each switch is carried out through the processings at step 10, step 20, step 30, step 32, step 40A, and step 40.

At step 10 and step 30, a switch state is detected by the vehicle control device 101A. At step 40A and step 40, a switch state is detected by the stand control device 102. At step 60 and step 80, a switch state is controlled by the vehicle control device 101A. At step 50, a switch state is controlled by the stand control device 102.

Operations and their effects produced by the power supply system 200 of the present embodiment will be described. The main energization line 20A in the power supply system 200 is formed by an electric connection of the vehicle 201 and the charging stand 202. The control device is configured by the vehicle control device 101A disposed in the vehicle 201, and the stand control device 102 for controlling the charging stand 202.

As a result of this configuration, the main energization line 20A is configured by electrical components disposed in the vehicle 201 and electrical components disposed in the charging stand 202. The respectively existing control devices can be assigned the necessary detection of switching states of the energization switching units 11 to 13 and their switching control. Accordingly, the power supply system 200, in which the configuration relating to detection and control of each energization switching unit is simplified, can be obtained.

Third Embodiment

A third embodiment will be described with reference to FIG. 5. In the present embodiment, configurations, operations, and controls, which are not described in particular; and processing having the same step reference numeral as hereinbefore, are similar to the first embodiment. Also, their operations and effects are similar to the first embodiment.

Figure 5:
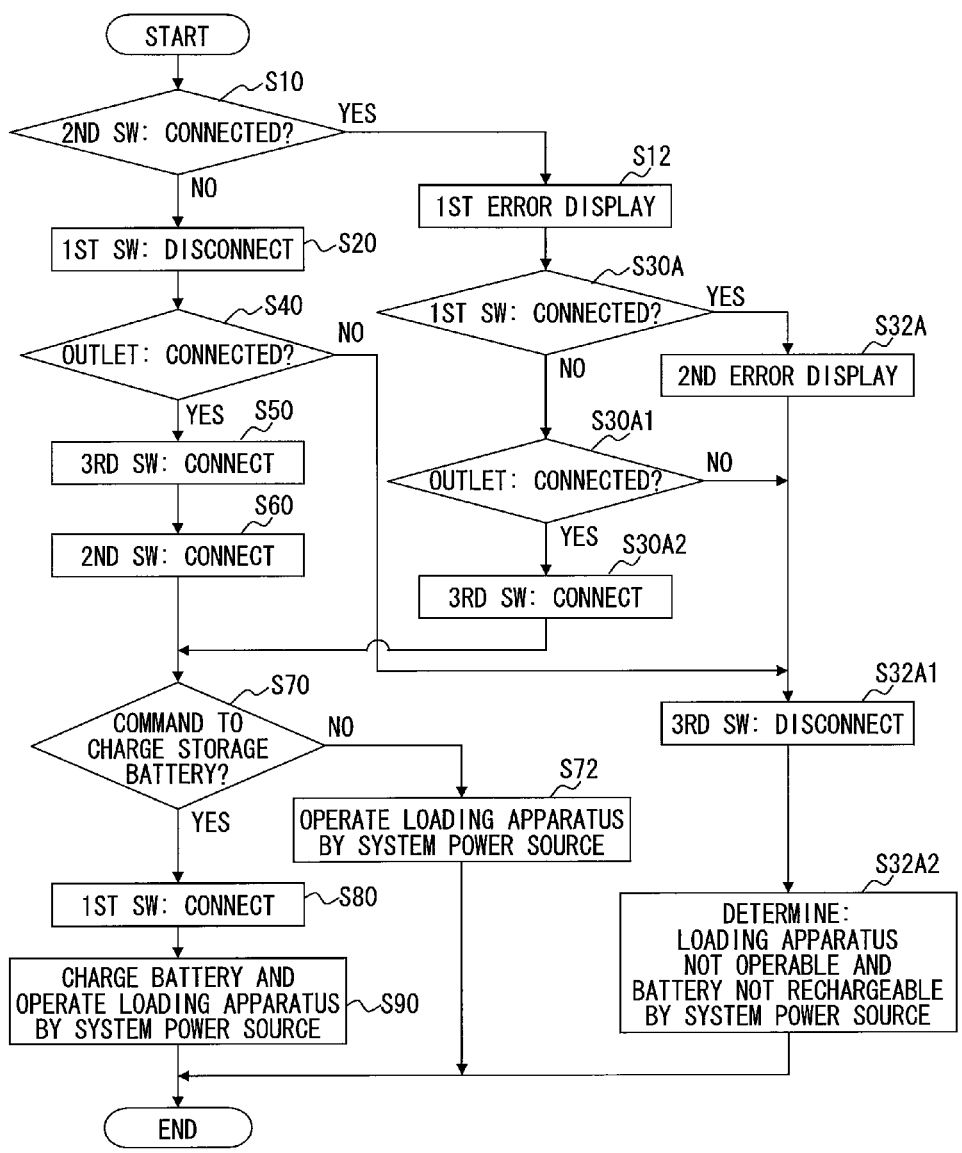
FIG. 5 is a flow chart relating to control for preventing a short-circuit current by a power supply system of a third embodiment.

A "flow chart relating to control for preventing a short-circuit current" described in the present embodiment is, as illustrated in FIG. 5, different from the flow illustrated in FIG. 2 of the first embodiment in that it has steps for performing two modes of error displays. Two-stage error is indicated by these two error displays. Accordingly, the user can continue the subsequent processings under certain conditions even if an error display on the first stage is made.

Respects different from the control of the first embodiment will be described below. As illustrated in FIG. 5, if it is determined at step 10 that a second switch 12 is in a connected state, control proceeds to step 12 to perform the first error display. This first error display is the error display on the first stage that is indicated on a display part 7 which is an example of a notifying means. When the user connects an outlet 4 to a system power source 1 at time of a stop of the vehicle to use system electric power, the user's attention can be drawn by this first error display. The first error display notifies the user that there is a possibility of adhesion at the second switch 12 as a result of the determination at step 10; all three switches are not abnormal; and that a limited operation of the vehicle can be safely carried out although an abnormal switch exists among them. Accordingly, even if the first error display is performed, the user does not need to promptly stop use of the vehicle and can do repairs afterward. Thus, the following processings can be continued.

After the user is notified of the first error display, it is determined at step 30A whether the first switch 11 is turned on and the energization line is in an energized state. If it is determined at step 30A that the first switch 11 is in a connected state, the contact of the first switch 11 may actually be in a connected state for some reason such as adhesion. Accordingly, control proceeds to step 32A to perform the second error display. This second error display is similar to the processing at step 32 in the first embodiment. When the user connects an outlet 4 to a system power source 1 at time of a stop of the vehicle to use system electric power, the user's attention can be drawn by the second error display. The user can recognize that the short-circuit current from the storage battery 2 may be passing through the terminal area of the outlet 4, and can cancel the connection of the outlet 4 or perform it carefully. Also, there may be a failure or the like at the switch of each part, so that maintenance such as repairing and checking can be encouraged. After that, step 32A1 similar to step 34 in the first embodiment, and step 32A2 similar to step 36 in the first embodiment are carried out to end this flow chart.

If it is determined at step 30A that the first switch 11 is in a disconnected state, similar to step 40 in the first embodiment, it is determined at step 30A1 whether the outlet 4 is in a connected state in which the outlet 4 is connected to the system power source 1. If it is determined at step 30A1 that the outlet 4 is in a disconnected state, the system power source 1 is not ready to supply the system electric power. Accordingly, after that, the above-described step 32A1 and step 32A2 are performed to end this flow chart. If it is determined at step 30A1 that the outlet 4 is in a connected state, it can be determined that each switch is not in an abnormal state and is ready to use the system electric power. Then, control proceeds to step 70 which is similar to the first embodiment to perform the subsequent processings described in the first embodiment, and ends this flow chart.

On the other hand, if it is determined at step 10 that the second switch 12 is in a disconnected state, at step 20 which is similar to the first embodiment, the first switch 11 is turned off to perform processing for putting the energization line into a non-energized state. This processing is carried out because the contact of the second switch 12 can be actually in a connected state for some reason such as adhesion although it is determined at step 10 that the second switch 12 is in a disconnected state. In this case, the second switch 12 is in an energized state. Next, it is determined at step 40 whether the outlet 4 is in a connected state in which the outlet 4 is connected to the system power source 1.

If it is determined at step 40 that the outlet 4 is in a disconnected state, the system power source 1 is not ready to supply the system electric power. Accordingly, after that, the above-described step 32A1 and step 32A2 are performed to end this flow chart. If it is determined at step 40 that the outlet 4 is in a connected state, it can be determined that each switch is not in an abnormal state and is ready to use the system electric power. Accordingly, processings to turn on the third switch 13 and the second switch 12 in this order are carried out at step 50 and step 60. Then, control proceeds to the above-described step 70 to perform the subsequent processings described in the first embodiment, and ends this flow chart.

If the control for preventing a short-circuit current in the present embodiment is applied to the power supply system 200 of the second embodiment, step 40A described in the second embodiment may be performed after step 20 and before step 30A1. If the determination at step 40A is YES, control proceeds to step 40 and to step 30A1 respectively. If the determination at step 40A is NO, control proceeds to step 32A1.

The embodiments have been described above. The present disclosure is not by any means limited to the above embodiments, and can be embodied in various modifications without departing from the scope of the present disclosure.

In the above embodiments, the electric storage device is the storage battery 2 as a stationary-type secondary battery. However, the electric storage device is not limited to this. The electric storage device may be an electricity storing means that can perform discharge and charge. For example, a capacitor can be employed for the electric storage device.

In the above-described embodiments, the device including the electric storage device is a vehicle. However, the device is not limited to this. For example, buildings such as a house, store, factory, warehouse including the electric storage device may be employed.

In the case of application of the present disclosure to a power supply system relating to a vehicle, the loading apparatus in the above embodiments may include a navigation system, in-vehicle television and so forth. In the case of application of the present disclosure to a power supply system relating to other than a vehicle, an apparatus using alternating-current power, such as a television, air-conditioner, and refrigerator, can be included in the loading apparatus.

The loading apparatus may be an apparatus for heat storage. The apparatus for heat storage is an apparatus for converting natural energy such as electricity generated by solar power, or system electric power into heat energy and for storing the heat energy. For example, the apparatus for heat storage includes a tank in which hot water is stored and a heat pump device which boils water to be turned into hot water stored in the tank. This apparatus for heat storage brings the water to the boil by the heat pump device using natural energy such as electricity generated by solar power, or system electric power, and stores the boiled water in the tank as heat quantity.

The error display is indicated on a screen of the display part 7 at step 32 in the above-described embodiments. However, the indication of the error display is not limited to such embodiments. At this step, the user only needs to be notified of the error. Thus, for example, the notifying means may be configured by distinct error notification by audio assist, generation of a warning sound, lighting-up or blinking of a lamp for warning, and so forth.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A power supply system electrically-connected to a system power source, the power supply system comprising:
an electric storage device that is configured to be capable of being charged with electric power supplied by the system power source and to be capable of discharging electric power into a loading apparatus, which is capable of operating through use of the electric power supplied by the system power source;
a connecting terminal area that is provided to be connected to the system power source at time of the electric connection of the power supply system to the system power source;
a main energization line that connects together the connecting terminal area and the electric storage device;
a sub-energization line that branches from a branched part, which is provided on the main energization line, to connect together the loading apparatus and the main energization line;
a first energization switching unit that switches an energization line of the main energization line, which connects the electric storage device and the loading apparatus, between an energized state and a non-energized state;
a second energization switching unit that switches an energization line of the main energization line, which connects together the branched part and the connecting terminal area, between an energized state and a non-energized state, the second energization switching unit is provided separately from the connecting terminal area;
a third energization switching unit that switches an energization line of the main energization line, which connects together the second energization switching unit and the connecting terminal area, between an energized state and a non-energized state;
a control device that detects switching states of the first energization switching unit, the second energization switching unit and the third energization switching unit and controls their switching operations; and
an electric power converter disposed between the second and third energization switching units; wherein
the electric storage device, the first energization switching unit, the branched part, the second energization switching unit, the electric power converter, the third energization switching unit and the connecting terminal area are provided in this order along the main energization line.

2. The power supply system according to claim 1, wherein the control device controls the third energization switching unit to be switched into a non-energized state,
   when the control device detects the switching state of the second energization switching unit to be an energized state; or
   when the control device detects that:
   the switching state of the second energization switching unit is a non-energized state; and
   the switching state of the first energization switching unit is an energized state after the first energization switching unit is controlled to be switched into a non-energized state.

3. The power supply system according to claim 2, further comprising a notifying unit for notifying outside about a conducted state between the electric storage device and the connecting terminal area, wherein the control device controls the notifying unit to notify the outside before or after the control device controls the third energization switching unit to be switched into a non-energized state.

4. The power supply system according to claim 1, wherein:
   the control device is capable of detecting whether the connecting terminal area is electrically-connected to the system power source; and
   the control device controls the third energization switching unit, the second energization switching unit, and the first energization switching unit to be switched into an energized state in this order when:
   the control device detects that the switching state of the second energization switching unit is a non-energized state;
   the control device detects that the switching state of the first energization switching unit is a non-energized state after the first energization switching unit is controlled to be switched into a non-energized state; and
   the control device detects that the connecting terminal area is electrically-connected to the system power source.

5. The power supply system according to claim 1, wherein the loading apparatus is an air-conditioning system that controls air-conditioning of a vehicle interior.

6. The power supply system according to claim 1, wherein the loading apparatus is a refrigeration cycle system that regulates temperature of a freezing chamber provided in a refrigerator car.

7. The power supply system according to claim 1, further comprising a vehicle and a charging stand, wherein:
   the main energization line is formed by an electric connection of the vehicle and the charging stand; and
   the control device includes:
   a vehicle control device that is disposed in the vehicle; and
   a stand control device that controls the charging stand.

8. The power supply system according to claim 1, wherein the first and second energization switching units are disposed electrically in series between the system power source and the electric storage device.

9. The power supply system according to claim 1, wherein the second and third energization switching units are disposed electrically in series between the system power source and the electric storage device.

10. The power supply system according to claim 1, wherein the first, second and third energization switching units are disposed electrically in series between the system power source and the electric storage device.

11. The power supply system according to claim 1, wherein the first energization switching unit is the only energization unit which prohibits the electric storage device from discharging the electric power into the loading apparatus.

12. The power supply system according to claim 1, wherein only the first and second energization switching units of the first, second and third energization switching units are the only energization switching units directly connected to the loading apparatus.

13. The power supply system according to claim 12, wherein only the third energization switching unit of the first, second and third energization switching units is the only energization switching unit directly connected to the system power source.

14. The power supply system according to claim 1, wherein only the third energization switching unit of the first, second and third energization switching units is the only energization switching unit directly connected to the system power source.

15. The power supply system according to claim 1, wherein the electric storage device is directly connected to only the first energization switching unit.

16. The power supply system according to claim 15, wherein the electric power converter is directly connected to only the second energization switching unit and third energization switching unit.

17. The power supply system according to claim 16, wherein the connecting terminal area is directly connected to only the system power source and the third energization switching unit.

18. The power supply system according to claim 1, wherein the electric power converter is directly connected to only the second energization switching unit and third energization switching unit.

19. The power supply system according to claim 1, wherein the connecting terminal area is directly connected to only the system power source and the third energization switching unit.

* * * * *